No. 874,584. PATENTED DEC. 24, 1907.
G. F. GODDARD.
CARPET CLEANER.
APPLICATION FILED APR. 28, 1906.
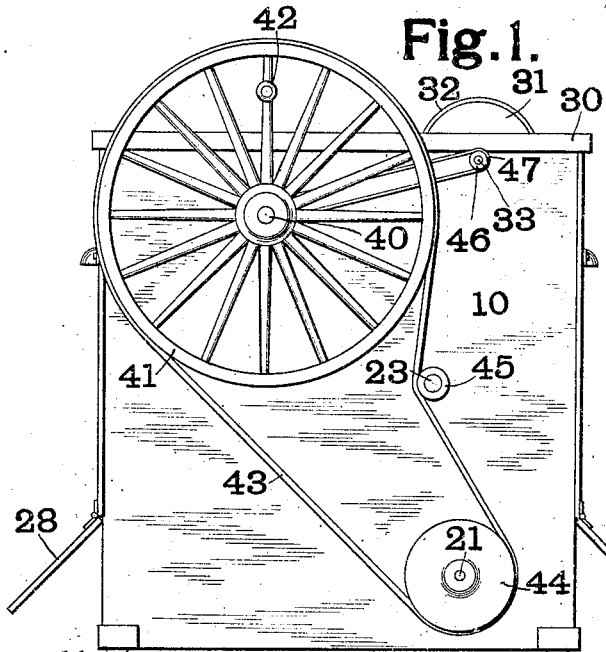
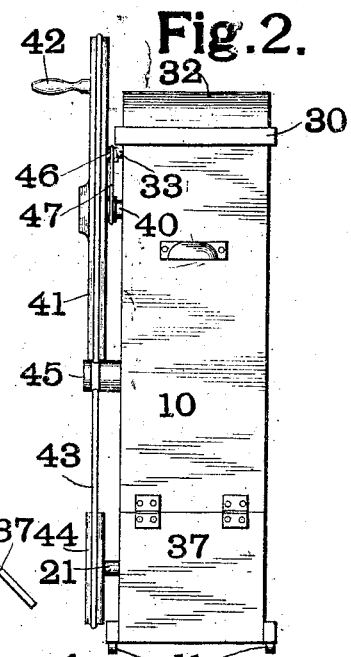
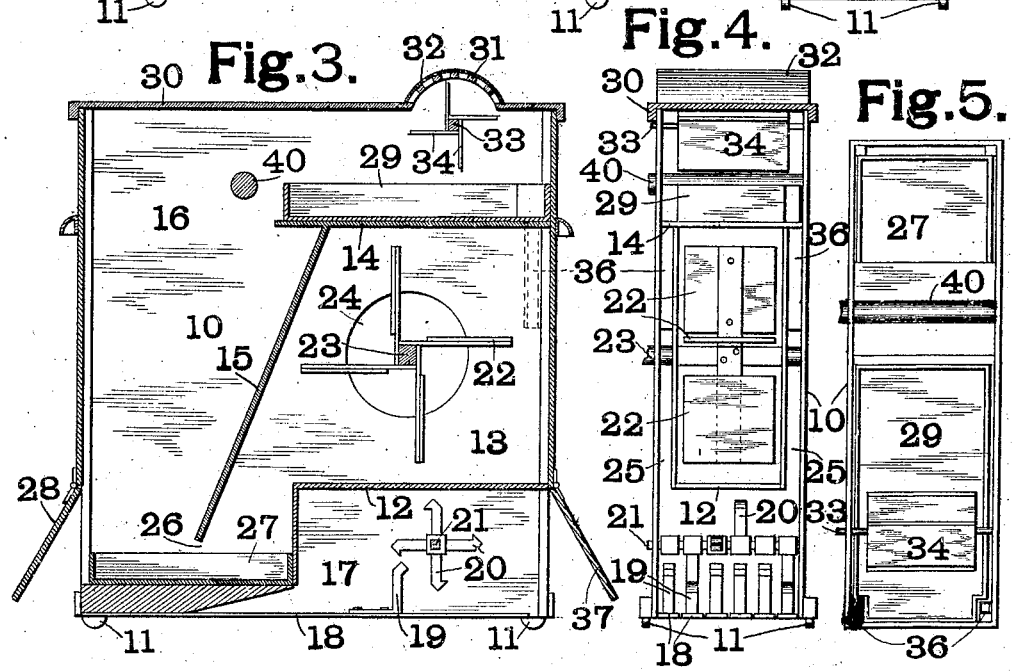
WITNESSES:
L. L. Mead.
W. A. Alexander.
INVENTOR
G. F. Goddard.
BY
Fowler & Bryson
ATTORNEYS

UNITED STATES PATENT OFFICE.

GEORGE F. GODDARD, OF ST. LOUIS, MISSOURI.

CARPET-CLEANER.

No. 874,584.

Specification of Letters Patent.

Patented Dec. 24, 1907.

Application filed April 28, 1906. Serial No. 314,134.

*To all whom it may concern:*

Be it known that I, GEORGE F. GODDARD, a citizen of the United States, residing at the city of St. Louis, in the State of Missouri, have invented a certain new and useful Carpet-Cleaner, of which the following is such a full, clear, and exact description as will enable any one skilled in the art to which it appertains to make and use the same, reference being had to the accompanying drawings, forming part of this specification.

The object of my invention is to provide a carpet cleaner which may be operated by hand or other suitable power to remove from the carpet fine dust such as not readily removed by the ordinary carpet sweeper.

In the accompanying drawings, which illustrate one form of carpet cleaner made in accordance with my invention, Figure 1 is a side elevation; Fig. 2 is a top plan view; Fig. 3 is a vertical central section; Fig. 4 is a front view, the front wall of the main casing being removed, and Fig. 5 is a top plan view, the cover being removed.

Like marks of reference refer to similar parts in the several views of the drawings.

10 is the main casing of the cleaner, said casing being provided with rollers or casters 11, so as to be moved easily over the floor in close proximity thereto. Situated within the main casing 10 is the fan casing 12 containing a fan chamber 13. The upper wall 14 and rear wall 15 of the fan casing 12 also separates the main casing 10 into a dust chamber 16 and a beater chamber 17. The bottom of the main casing 10, which is also the bottom of the beater chamber 17 is open and is provided with a plurality of flexible strips 18, which form the beaters. Each of these strips 18 is provided with upwardly extending projections 19, which are adapted to be engaged by radial arms 20 carried on a shaft 21. These arms 20 are spirally disposed around the shaft 21, so as to successively engage the projections 19 to raise the beaters 20 which are returned against the carpet by the resiliency of the material of which they are formed. Within the fan chamber 13 is a fan 22 mounted on a shaft 23. The ends of this shaft 23 extend through openings 24 in the sides of the fan casing. These openings 24 communicate with spaces 25 between the fan casing and the main casing. The spaces 25 communicate with the beater chamber 17, as best shown in Fig. 4. The fan chamber 13 communicates with the dust chamber 16 by means of a passage 26 and adjacent to this passage 26 is a dust pan 27 adapted to be removed from the casing through a door 28 at the rear of the main casing 10. Supported upon the upper wall of the fan casing 12 is a second dust pan 29 adapted to be removed from the casing when the top 30 is removed. The top 30 is provided with a curved grating 31 covered with foraminous material 32, so as to allow of the escape of air from the casing, but to retain the dust within the casing.

In order to remove the accumulated dust from the grating 31, I provide a shaft 33 with scrapers 34, which are adapted to bear against the inner face of the said grating. The dust chamber 16 communicates with the spaces 25 between the fan casing and the main casing by means of short tubes 36, which extend downwardly, preferably somewhat below the upper part of the openings 24 in the sides of the fan casing, as best shown in Fig. 4.

37 is a door situated at the opposite end of the casing from the door 28 and adapted to give access to the beater chamber 17.

In order to operate the movable parts of my device I journal in the walls of the main casing 10 a shaft 40, upon which is mounted a driving wheel 41 provided with a handle 42, by means of which the wheel may be manually rotated. Passing around the wheel 41 is a belt 43, which also passes around a smaller wheel 44 on the end of the shaft 21 carrying the arms 20 for operating the beaters 18. This belt 43 also passes below and at the rear of a small pulley 45 on the end of the fan shaft 23, so as to operate the said fan shaft. The shaft 33 carrying the scrapers 34 is also provided with a pulley 46, around which passes a belt 47, which also surrounds the driven shaft 40. Thus by rotating the hand wheel 41 the beaters 18, fan 22 and scrapers 34 are operated.

The operation of my carpet cleaner is as follows: The casing 10 is moved over the carpet to be cleaned on the rollers or casters 11 and the hand wheel 41 is rotated by means of the handle 42. This causes the shaft 21 to revolve, thus alternately lifting and releasing the beaters 18, so that the carpet beneath the casing 10 is thoroughly beaten, the dust rising into the beater chamber 17 and passing up into the spaces 25 between the main casing 10 and the fan casing 12. The fan 22 is at the same time rapidly revolved so as to drive the air within the fan chamber 13 through the passage 26 into the dust chamber 16. As the air passes from the fan chamber 13 to the dust chamber 16, the heavier particles of dust will be deposited in the dust pan 27. The air will then rise and circulate through the chamber 16, where considerable of the lighter dust will be deposited in the dust pan 29. A portion of the air then passes downward through the tubes 36 into the spaces 25 and thence through the openings 24 again into the fan chamber 13, thus performing a complete cycle through the machine. Inasmuch, however, as the air passing down through the tubes 36 is considerably less in quantity than that driven from the fan chamber 13, the deficiency will be supplied from the spaces 25, thus carrying into the fan chamber and dust chamber the dust which is thrown up by the action of the beaters 18. The surplus air will pass out through the grating 31, the finest particles of dust being retained by the foraminous covering 32. The action of the scrapers 34 removes this dust from the grating so as to prevent the clogging of the outlet for the air. After the cleaner has been used the dust pans 27 and 28 can be removed by opening the door 28 and removing the top 30.

Having fully described my invention, what I claim as new and desire to secure by Letters Patent of the United States is—

1. A carpet cleaner provided with a dust-collecting chamber, a beater-chamber provided with means for beating the carpet, a fan casing provided with a fan, the said dust chamber extending above, to one side of and to the bottom of said fan casing, said fan casing being located intermediate between said dust and beater chambers and communicating with said dust chamber near the lower part thereof and also communicating with said beater chamber, whereby the fan serves to suck the dust from the beater-chamber and discharge it into the dust-chamber, and a dust collecting tray or pan located within the bottom of said dust chamber, and a second dust collecting tray or pan located in the upper part of said dust chamber above said fan casing.

2. A carpet cleaner provided with a dust-collecting chamber, a beater-chamber provided with means for beating the carpet, a fan casing provided with a fan, said fan casing being located intermediate between said dust and beater chambers and communicating with each respectively, whereby the fan serves to suck the dust from the beater chamber and discharge it into the dust chamber, said cleaner being provided with a return passage leading from said dust chamber to the intake of the said fan chamber, and also provided with an air outlet for said dust chamber adapted to permit a less outflow of air than is introduced by the fan to said dust chamber, whereby the surplus air is returned through said return passage.

3. A carpet cleaner provided with a dust-collecting chamber, a beater-chamber provided with means for beating the carpet, a fan casing provided with a fan, said fan casing being located intermediate between said dust and beater chambers and communicating with each respectively, whereby the fan serves to suck the dust from the beater-chamber and discharge it into the dust-chamber, said cleaner being provided with a return passage leading from said dust-chamber to the intake of the said fan chamber, and also provided with an air outlet for said dust chamber adapted to permit a less outflow of air than is introduced by the fan to said dust chamber, whereby the surplus air is returned through said return passage, and the communication between said beater chamber and said fan chamber having a portion of their path in common.

4. A carpet cleaner provided with a dust collecting chamber, a beater chamber, a fan casing provided with a fan communicating with both said dust and beater chambers and serving to suck the air from the beater chamber and deliver it into the dust chamber, a plurality of independent beaters in said beater chamber, and normally held out of close contact with the carpet, and means for successively actuating said beaters.

5. A carpet cleaner provided with a dust collecting chamber, a beater-chamber, a fan casing provided with a fan and communicating with both said dust and beater chambers and serving to suck the air from the beater chamber and deliver it into the dust chamber, and a set of beaters comprising flexible strips provided with means for flexing each strip and releasing the same to snap it against the carpet.

6. A carpet cleaner provided with a dust collecting chamber, a beater chamber provided with means for beating the carpet, a fan casing provided with a fan, the said dust chamber extending above to one side of and to the bottom of said fan casing, said fan casing being located intermediate between the dust and beater chambers and communicating with said dust chamber near the lower part thereof and also communicating with said beater chamber, and a dust-collecting tray or pan located within the bottom of said dust chamber and extending into said fan casing.

In testimony whereof, I have hereunto set my hand and affixed my seal in the presence of the two subscribing witnesses.

GEORGE F. GODDARD. [L. S.]

Witnesses:
W. A. ALEXANDER,
BENNETTE PIKE.